(12) United States Patent
Hanson

(10) Patent No.: US 11,488,566 B2
(45) Date of Patent: *Nov. 1, 2022

(54) LOW VOLUME DRUMHEAD

(71) Applicant: Christopher Hanson, Ooltewah, TN (US)

(72) Inventor: Christopher Hanson, Ooltewah, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/140,079

(22) Filed: Jan. 3, 2021

(65) Prior Publication Data

US 2021/0125591 A1    Apr. 29, 2021

Related U.S. Application Data

(63) Continuation of application No. 16/741,218, filed on Jan. 13, 2020, now Pat. No. 10,885,887.

(60) Provisional application No. 62/838,181, filed on Apr. 24, 2019.

(51) Int. Cl.
| | | |
|---|---|---|
| *G10D 13/24* | (2020.01) | |
| *G10D 13/20* | (2020.01) | |
| *B32B 5/02* | (2006.01) | |
| *B32B 7/12* | (2006.01) | |
| *B32B 27/34* | (2006.01) | |
| *B32B 27/36* | (2006.01) | |

(52) U.S. Cl.
CPC ............ *G10D 13/24* (2020.02); *B32B 5/028* (2013.01); *B32B 7/12* (2013.01); *B32B 27/34* (2013.01); *B32B 27/36* (2013.01); *G10D 13/20* (2020.02); *B32B 2305/02* (2013.01); *B32B 2307/518* (2013.01)

(58) Field of Classification Search
CPC ........ G10D 13/24; G10D 13/20; B32B 5/028; B32B 7/12; B32B 27/34; B32B 27/36; B32B 2305/02; B32B 2307/518; B32B 7/02; B32B 27/12; B32B 2250/44; B32B 2262/0253; B32B 2262/0261; B32B 2262/0284; B32B 2262/101; B32B 2307/718; B32B 5/024; B32B 5/26
See application file for complete search history.

(56) References Cited

U.S. PATENT DOCUMENTS 10,885,887 B2 * 1/2021 Hanson .................... B32B 5/26

OTHER PUBLICATIONS

Black Hole Practice System.

* cited by examiner

*Primary Examiner* — Kimberly R Lockett
(74) *Attorney, Agent, or Firm* — RC Trademark Company

(57) ABSTRACT

According to some embodiments, a low volume drumhead is disclosed. The low volume drumhead comprises a mesh layer to be removably coupled to a drum hoop. The low volume drumhead further comprises a non-mesh layer affixed to a beatable surface of the mesh layer. An adhesive comprising elastic polymers is used to couple the mesh layer to the non-mesh layer.

18 Claims, 3 Drawing Sheets

LOW VOLUME DRUMHEAD

BACKGROUND

A drum kit is a collection of drums and other percussion instruments, such as cymbals, which are set up on stands to be played by a single musician. To play a drum kit, drumsticks are typically held in each hand and the feet operate one or more pedals to control cymbals or a beater for a bass drum. In a band situation, the drum kit is the loudest acoustic instrument and, because the volume of the drums kit, amplifiers were created to overcome the volume of drums. To lower the volume of the drum kit, a mesh drumhead was created to allow a drum to be played at a lower volume than ordinary drumheads. As illustrated in FIG. 1, a mesh drumhead 100 has a mesh beatable surface 110 (e.g., beatable by a drum stick) that is stretched on a metal loop 120. However, while mesh drumheads are lower in volume, they also fail to meet the needs of professional musicians because of the poor sound quality generated while using these drumheads. Sounds from a mesh drumhead can be distorted and the sonic quality is unlike the sound of traditional drumheads. Therefore, it would be desirable for a drumhead to be lower in volume and still have the same sonic quality that desired by professional musicians.

SUMMARY

Some embodiments described herein relate to a low volume drumhead. The low volume drumhead may comprise a mesh layer to be removably coupled to a drum hoop. The low volume drumhead may further comprise a non-mesh layer that may be affixed to a beatable surface of the mesh layer. An adhesive comprising elastic polymers may be used to couple the mesh layer to the non-mesh layer.

DETAILED DESCRIPTION

Figure 1:
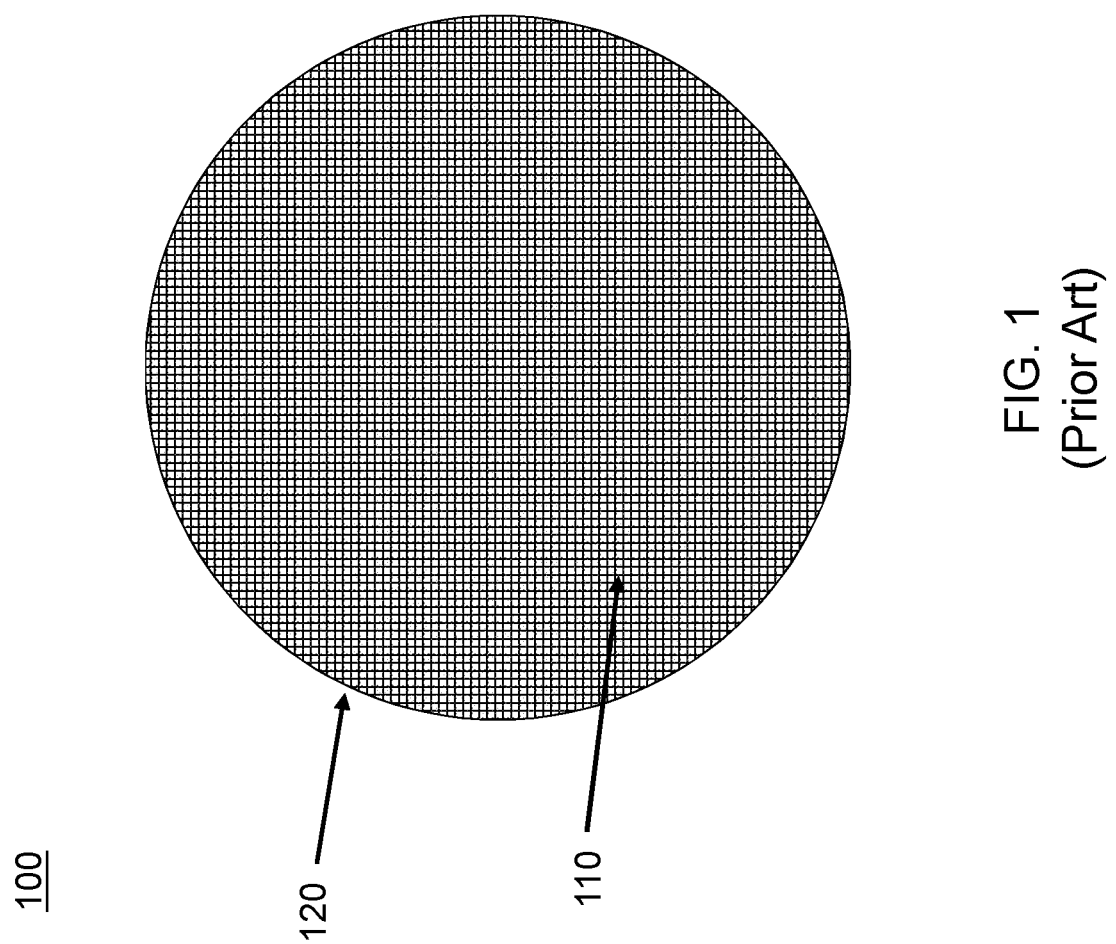
FIG. 1 illustrates a mesh drumhead.

In the following detailed description, numerous specific details are set forth in order to provide a thorough understanding of the embodiments. However, it will be understood by those of ordinary skill in the art that the embodiments may be practiced without these specific details. In other instances, well-known methods, procedures, and components have not been described in detail so as not to obscure the embodiments.

The present embodiments described herein relate to low volume acoustic drumhead that is lower in volume, in response to being struck, than a conventional drumhead but still has the sonic quality that is desired by professional musicians. In particular, the present embodiments relate to adding mass to a mesh-style acoustic drumhead by filling in a portion of the mesh to create a solid or semi-solid playing surface which may have the effect of adding the sonic qualities back while keeping the volume of the acoustic drumhead at a lower volume.

Conventional mesh drumheads create an almost completely "silent" drum sound due to the very small amount of mass being moved when the drumhead is struck by a drum stick. Adding mass such as, but not limited to, resin, an adhesive, a sheet of biaxially-oriented polyethylene terephthalate (e.g., MYLAR), and/or a fiberglass sheets to the mesh drumhead that fills in a portion of the mesh (e.g., a plurality of openings in the mesh) may increase the volume of the drum and create a desirable sound. Moreover, the volume of the drumhead may be fine-tuned at a time of manufacture based on an amount of mass being added. In some embodiments, fine tuning may be based on varying a relative diameter of a MYLAR or a fiberglass sheet to the underlying mesh drumhead during the manufacturing process that is placed over filled in mesh. The more mass added to the mesh drumhead, the greater the volume, with a continuous range of drum sound volumes from almost silent to almost as loud as a conventional drumhead made exclusively of MYLAR or fiberglass. Also, the addition of a mylar or fiberglass sheet to the top of the filled in mesh drumhead (e.g., filled in with rubber cement) may restore the right "feel" of the drumhead (e.g., how it responds to a strike from a drum stick) to an accomplished drum player as well as the correct sound that an accomplished drummer expects. For example, simply using a sticker or sheet with a backing adhesive will only attach to a top surface of the existing mesh (i.e. on an uppermost surface of the mesh but not between the openings in the mesh) instead of adhering to a filled in mesh surface. Stickers or sheets with a backing adhesive may not produce a proper sound (e.g., resonate properly) or may become partially unstuck and produce a buzzing sound. For example, when a drumhead is tuned, the head is stretched and the sticker may simply detach. Therefore, a filled in mesh, that creates a substantially solid surface, may be far more desirable than using a sticker or pasted on sheet because it may produce a more realistic sound and feel. Likewise, only filling in the mesh with an elastic or rubber-based non-adhesive material does not restore the right "feel" of the drumhead to an accomplished drum player (e.g., how it responds to a strike from a drum stick) because the elastic or rubber filler deadens a recoil of the drum stick by making the surface softer than traditional MYLAR. Moreover, the deadened strike from an elastic or rubber filler does not produce the sound that can be achieved from a traditional MYLAR drumhead.

Figure 2:
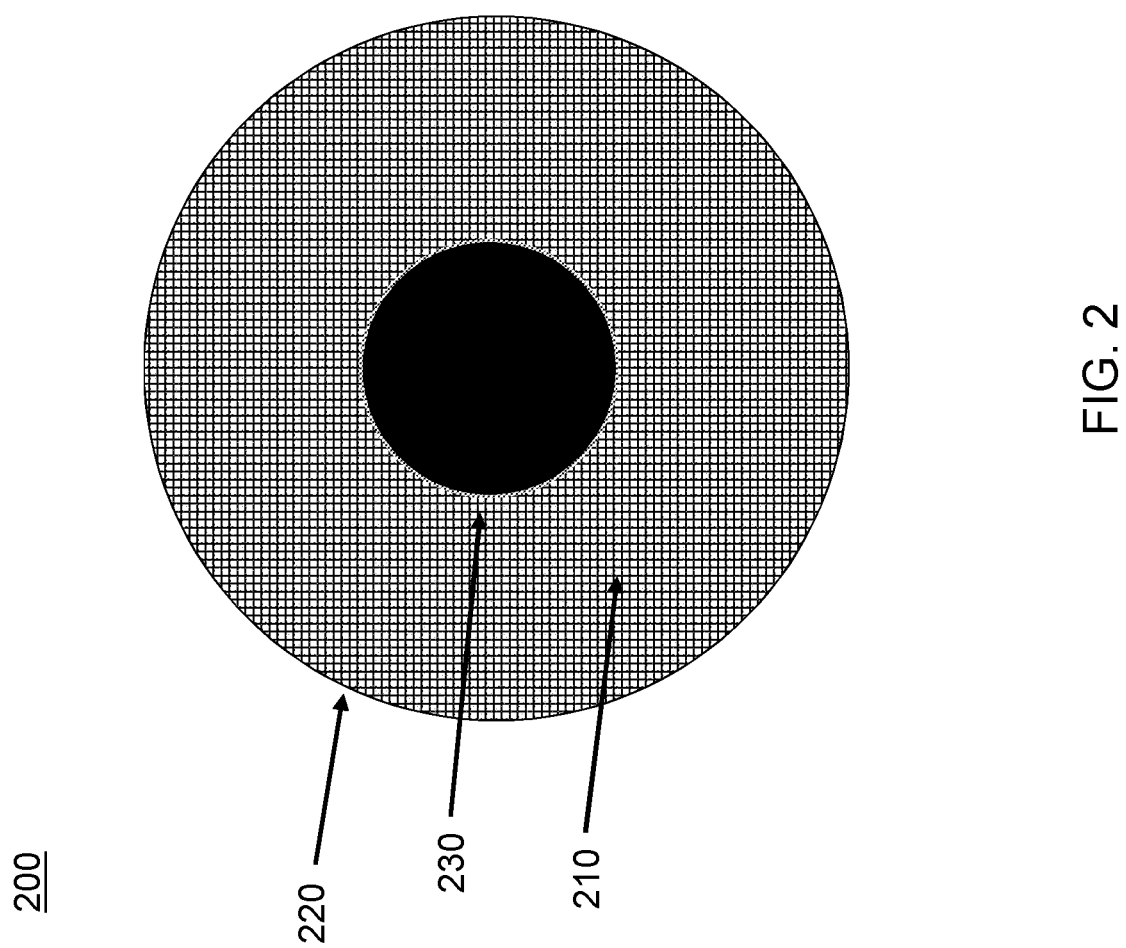
FIG. 2 illustrates a drumhead in accordance with some embodiments.

Referring now to FIG. 2, an embodiment of a drumhead 200 is illustrated. The drumhead 200 may comprise a first layer 210 that includes a beatable surface (e.g., beatable by a drum stick) where the beatable surface faces toward a musician. The first layer 210 may be stretched on a metal loop 120. The metal loop 120 may be inserted into a drum hoop (not shown) to stretch the first layer so that the drumhead may be tuned to a desired pitch. As such, the first layer 210 on the metal loop 120 may be removably coupled to the drum hoop. The first layer 210 may be comprised of a polyethylene terephthalate (PET)-based material. In some embodiments, the first layer 210 may be comprised of a polyester monofilament. The first layer 210 may comprise the following properties: a material weight of 5.7 ounces per square yard; warp and fill deniers 500/1; and a woven construction of 49×48. In some embodiments, the first layer 210 may comprise polypropylene. Furthermore, and as illustrated in FIG. 2, a second layer 230 may be affixed to a portion (e.g., a center) of the beatable surface of the first layer 210. The second layer 230 may not be removably coupled to the drum hoop.

The second layer 230 may comprise, a non-mesh material, such as, but not limited to, an adhesive, a resin, or one or more layers of fiberglass or biaxially-oriented polyethylene terephthalate (e.g., MYLAR). The second layer 230 may function to add mass back to the first layer 210. For example, in a case where the first layer 210 comprises a mesh drumhead (e.g., a MYLAR mesh drumhead), the second layer 230 may add mass back to the mesh drumhead which may increase a volume sound produced by the mesh head as well as provide a change in the tone of the drumhead 200. As illustrated, a diameter of the first layer 210 is greater than a diameter of the second layer 230. A volume of the drum may be based on a size of the second layer. For example, a larger second layer 230 may add more mass back into the drumhead 200 and thus may produce more volume. As such, a variety of volumes of sound produced by drumheads may be produced based on the size of the second layer 210. In some embodiments, the first layer 210 may be comprised of a first material and the second layer is comprised of a second material wherein the first material is different than the second material. For example, the first layer 210 may be comprised of nylon or MYLAR, or a combination thereof, and the second layer 230 may be comprised of MYLAR.

In some embodiments, the second layer 230 may comprise MYLAR and the second layer 230 may be affixed to the first layer 210 that is also comprised of MYLAR via an adhesive. The adhesive may comprise rubber cement (e.g., an adhesive comprising elastic polymers). An adhesive comprising elastic polymers (e.g., rubber cement) may have an advantage over other adhesives in that it may fill in a plurality of openings in the mesh to create a substantially solid or semi-solid surface and it may stretch as the drumhead is tightened/tuned which may keep the second layer from tearing away (e.g., a hardened adhesive may crack when stretched) from the first layer and the rubber cement may facilitate a more playable feel for a professional musician. However, in some embodiments, rubber cement may not be used on its own as it may remain tacky and pliable which may deaden the sound of a stick hitting the drumhead or the rubber cement may adhere to the drum stick as the drum stick strikes the drumhead. Therefore, adding a MYLAR sheet over the rubber cement solves the problem of tunability, feel and sound from a drumhead that produces a lower volume. In some embodiments, a surface area of the rubber cement adhesive is substantially the same as a surface area of the second layer 230.

In some embodiments, the second layer 230 may comprise MYLAR and the second layer 230 may be affixed to the first layer 210 via an adhesive comprising elastic polymers. In some embodiments, the second layer 230 may comprise a 7 mil to 10 mil circular sheet of MYLAR or fiberglass.

In some embodiments, three layers may be used to create a low volume drumhead. In this embodiment, the second layer 230 may be affixed to a beatable surface of a first layer 210 and a third layer (not shown in FIG. 2) may be applied to an opposite side of the first layer 210 (e.g., opposite from the second layer 230). This embodiment has an added advantage of preventing leakage of the adhesive from the top side through the mesh drumhead to the bottom side since the third layer may contain any such leakage.

Figure 3:
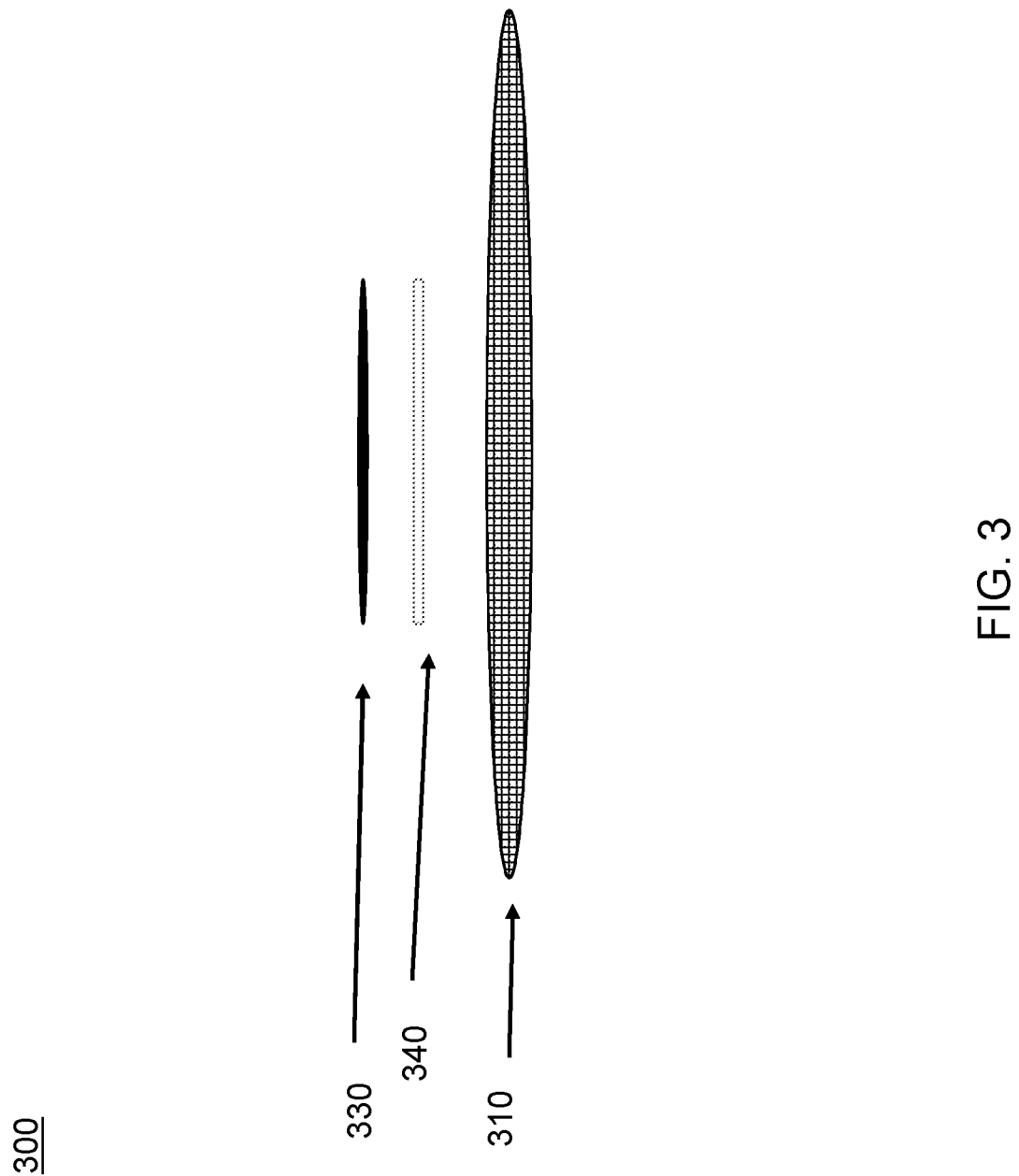
FIG. 3 illustrates a drumhead in accordance with some embodiments.

Referring now to FIG. 3, a low volume drumhead 300 is illustrated. As illustrated in FIG. 3, the low volume drumhead 300 may comprise a first layer 310 with a beatable surface (e.g., beatable by a drum stick) facing toward a musician. A second layer 330 may be affixed to a portion (e.g., a center portion) of the beatable surface of the first layer 310 via an adhesive 340. As illustrated in FIG. 3, the low volume drumhead 300 may comprise the first layer 310 with a beatable surface (e.g., beatable by a drum stick) facing toward a musician that is affixed to the second layer 330. The second layer 330 may be affixed to a portion (e.g., a center portion) of the beatable surface of the first layer 310 via rubber cement 340.

In some embodiments, instead of using rubber cement, the low volume drumhead 300 that comprises the first layer 310 with a beatable surface and the second layer 330 may be constructed through a lamination process. In particular the second layer 330 may be laminated to a portion of the first layer 310 via a resin. The resin may be disposed between the first layer 310 and the second layer 330. The resin may comprise at least one of epoxy, vinylester, a polyester resin and/or silicone. In the present embodiment, heat may be used to laminate the second layer 330 and the resin to the first layer 320 to form a low volume drumhead 300. In some embodiments, the resin may only be used on a portion of the first layer 310 and the second layer 330. In some embodiments, the second layer 330 may be affixed to a portion (e.g., a center portion) of the beatable surface of the first layer 310 via rubber cement 440 and double-sided tape. In this embodiment, rubber cement 440 may be used to secure a majority of the second layer 330 while double-sided tape may be used to secure the edges of the second layer 330. This combination of rubber cement 440 and double-sided tape may help prevent the second layer 330 from pulling up from the first layer 340 In some embodiments, the double-sided tape may be ⅛ to ½ inch in width. In some embodiments, only double-sided tape may be used.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A low volume tunable drumhead, comprising:
   a mesh layer comprised of a polyethylene terephthalate (PET)-based material stretched on a metal loop, where the first layer on the metal loop is to be further stretched via a drum hoop so that the low volume drumhead is tuned to a desired pitch;
   an adhesive to fill in a plurality of openings in the mesh layer; and
   a non-mesh layer comprised of biaxially-oriented polyethylene terephthalate affixed to a beatable surface of the mesh layer via the adhesive, wherein a diameter of the mesh layer is greater than a diameter of the non-mesh layer and wherein the adhesive is disposed between the mesh layer and the non-mesh layer.

2. The low volume tunable drumhead of claim 1, wherein a surface area of the adhesive is substantially the same as a surface area of the non-mesh layer.

3. The low volume tunable drumhead of claim 1, wherein the mesh layer is comprised of biaxially-oriented polyethylene terephthalate and nylon.

4. A low volume tunable drumhead, comprising:

a mesh layer to be stretched on a metal loop, where the mesh layer on the metal loop is to be further stretched via a drum hoop so that the low volume drumhead is tuned to a desired pitch;

an adhesive to fill in a plurality of openings within the mesh layer; and a non-mesh layer affixed to a beatable surface of the mesh layer via the adhesive wherein the adhesive is disposed between the mesh layer and the non-mesh layer.

5. The low volume drumhead of claim 4, wherein a diameter of the mesh layer is greater than a diameter of the non-mesh layer.

6. The low volume drumhead of claim 4, wherein the mesh layer is comprised of a first material and the non-mesh layer is comprised of a second material and wherein the first material is different than the second material.

7. The low volume drumhead of claim 4, wherein the mesh layer comprises a polyethylene terephthalate (PET)-based material.

8. The low volume drumhead of claim 4, wherein the mesh layer comprises nylon.

9. The low volume drumhead of claim 8, wherein the non-mesh layer comprises biaxially-oriented polyethylene terephthalate.

10. The low volume drumhead of claim 4, wherein the mesh layer comprises a combination of nylon and biaxially-oriented polyethylene terephthalate.

11. A low volume tunable drumhead, comprising:

a mesh layer material stretched on a metal loop, where the mesh layer on the metal loop is to be further stretched via a drum hoop so that the low volume drumhead is tuned to a desired pitch;

an adhesive to fill in a plurality of openings in the mesh layer; and a non-mesh layer affixed to a beatable surface of the mesh layer via the adhesive, wherein a diameter of the mesh layer is greater than a diameter of the non-mesh layer wherein the adhesive is disposed between the mesh layer and the non-mesh layer.

12. The low volume drumhead of claim 11, wherein the mesh layer is comprised of a first material and the non-mesh layer is comprised of a second material and wherein the first material is different than the second material.

13. The low volume drumhead of claim 11, wherein the non-mesh layer comprises biaxially-oriented polyethylene terephthalate.

14. The low volume drumhead of claim 11, wherein the mesh layer comprises a polyethylene terephthalate (PET)-based material.

15. The low volume drumhead of claim 11, wherein the mesh layer is comprised of biaxially-oriented polyethylene terephthalate and nylon.

16. The low volume drumhead of claim 11, wherein the mesh layer comprises nylon.

17. The low volume drumhead of claim 11, wherein the mesh layer comprises a material weight of 5.7 ounces per square yard.

18. The low volume drumhead of claim 11, wherein the mesh layer comprises polypropylene.

\* \* \* \* \*